Jan. 2, 1968   W. J. CONOVER   3,361,115
POULTRY CAGE LAYER HOUSE
Filed March 4, 1966   5 Sheets-Sheet 3

INVENTOR
WILLIAM J. CONOVER
BY
ATTORNEY

INVENTOR
WILLIAM J. CONOVER
BY
*Robert Henderson*
ATTORNEY

United States Patent Office 3,361,115
Patented Jan. 2, 1968

1

3,361,115
POULTRY CAGE LAYER HOUSE
William J. Conover, Rhodes, Iowa, assignor to Black, Sivalls & Bryson, Inc., Kansas City, Mo., a corporation of Delaware
Filed Mar. 4, 1966, Ser. No. 531,688
10 Claims. (Cl. 119—18)

This invention relates generally to a poultry building, and particularly to a poultry cage house providing an improved arrangement of cages in combination with automated feed, water, and droppings removal devices, and further wherein a horizontally and vertically movable egg gathering cart is thereby useable.

It is an object of this invention to provide a new and novel poultry egg laying house.

It is another object of this invention to provide an egg laying house wherein substantially the entire process of feeding the layers, disposing of the droppings, cleansing the cages, the watering troughs, and the droppings boards, and gathering the eggs and servicing the layers and their cages is automated.

It is yet another object of this invention to utilize the most economical structure for housing the cages, specifically a circular bin, and as importantly, using a commercially available, conventional grain bin.

Still another object of this invention is to provide a complete egg laying unit for a farmer or operator which requires no more land space or extra labor, but which ensures the basis for profitable egg production.

Another object of this invention is the provision of a poultry cage house based upon a circular building of known construction providing excellent ventilation during all seasons.

Another object of this invention is to provide a poultry cage house enclosing a plurality of circular multi-stacked cages wherein a common feeding and watering system is available to all said cages, a common cleansing system is also available thereto, and furthermore wherein a common egg gathering system is available thereto.

Yet another object of this invention is the provision of a poultry cage house enclosing a plurality of circular-multi-stacked cages of a height greater than the average human wherein an overhead supported, horizontally and vertically movable elevator is provided for the operator, whereby the operator can gather eggs and simultaneously supervise the automatic, mechanized feeding of the layers, watering of the layers, and cleaning of their cages and watering means.

Still another object of this invention is the provision of a new and novel combination of structures unknown prior to this invention which combine to attain all the aforementioned objectives, and which structures are economical to manufacture, simple and rugged in appearance, and effective in operation.

These objects, and other features and advantages of this invention will become readily apparent upon reference to the following description, when taken in conjunction with the accompanying drawings, wherein.

2

Figure 3:
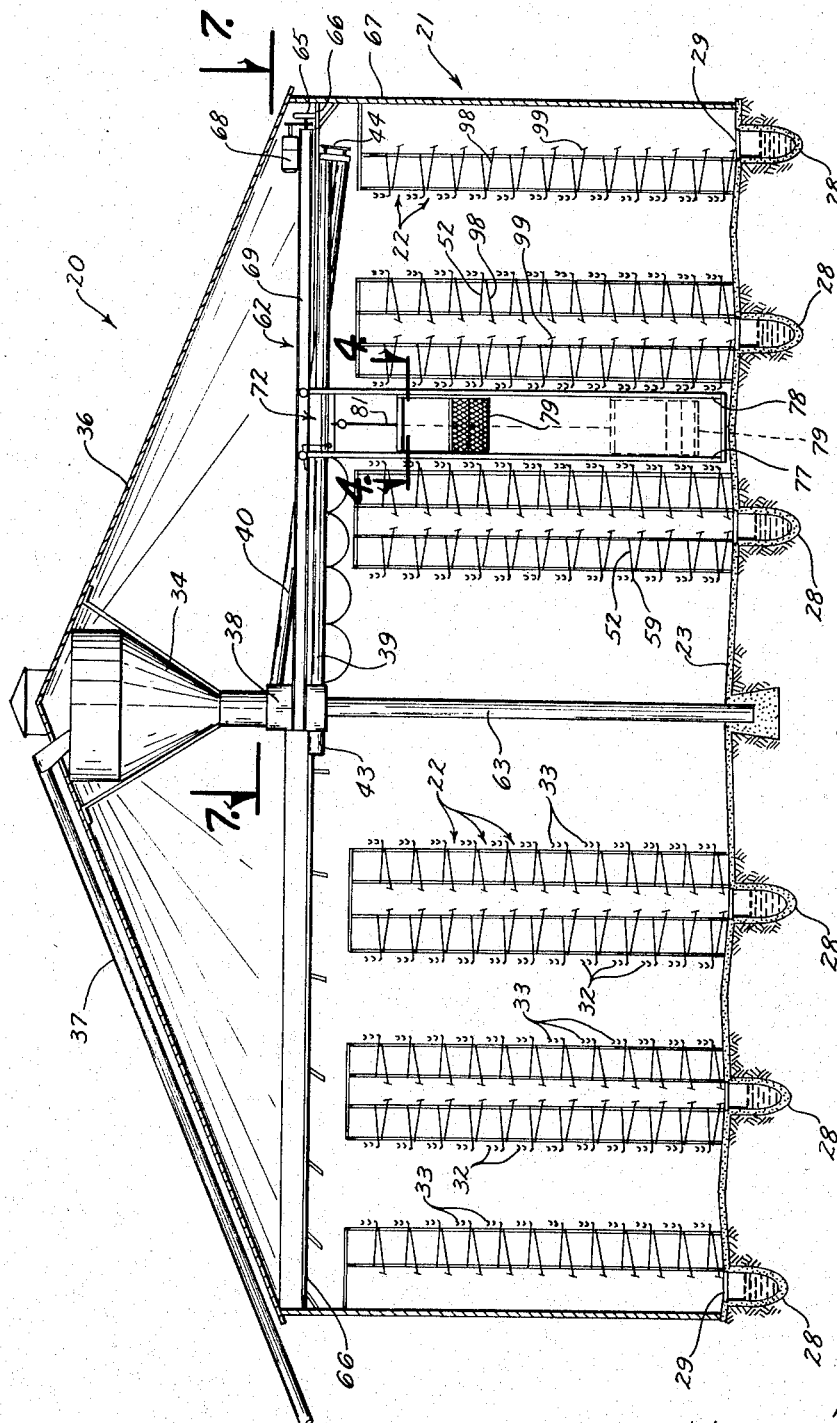
FIG. 3 is an enlarged, vertical sectional view taken along the line 3—3 in FIG. 1, with the arcuate extension of the cage rows deleted for clarification of illustration.
Figure 4:
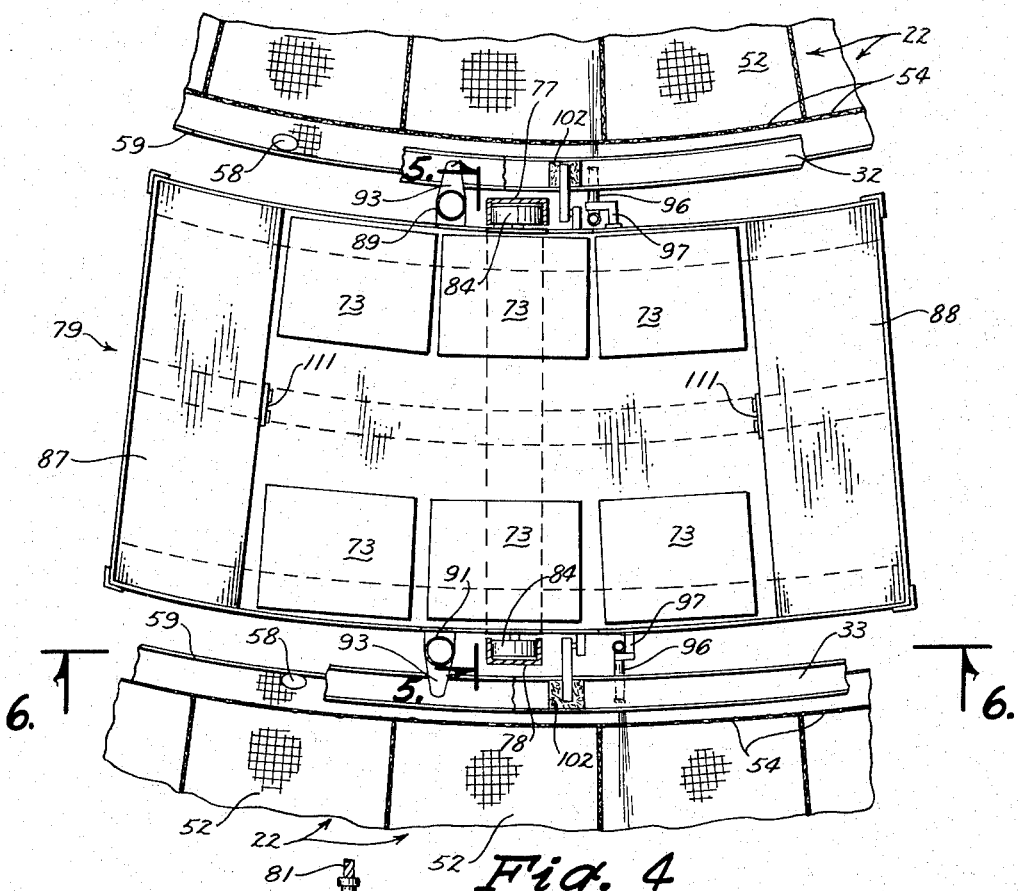
FIG. 4 is an enlarged, plan view of the elevator and adjacent cages as taken along the sectional line 4—4 in FIG. 3.
Figure 6:
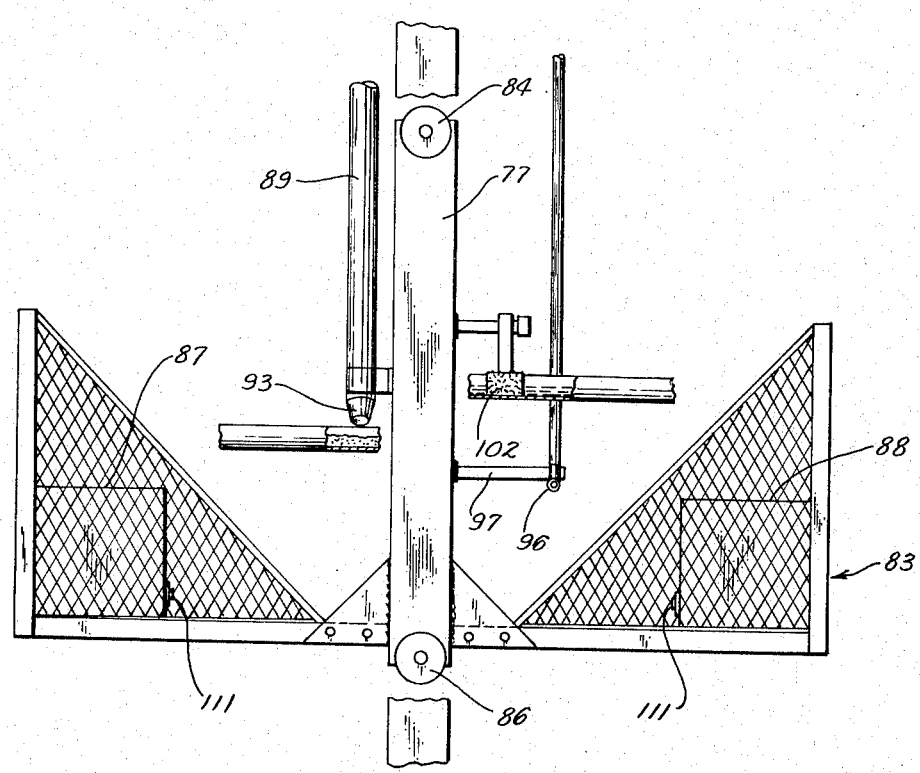
Figure 7:
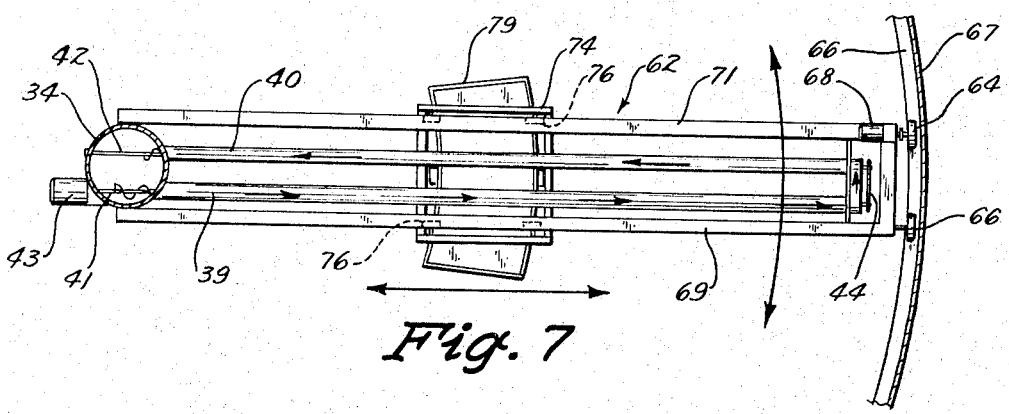
Figure 8:
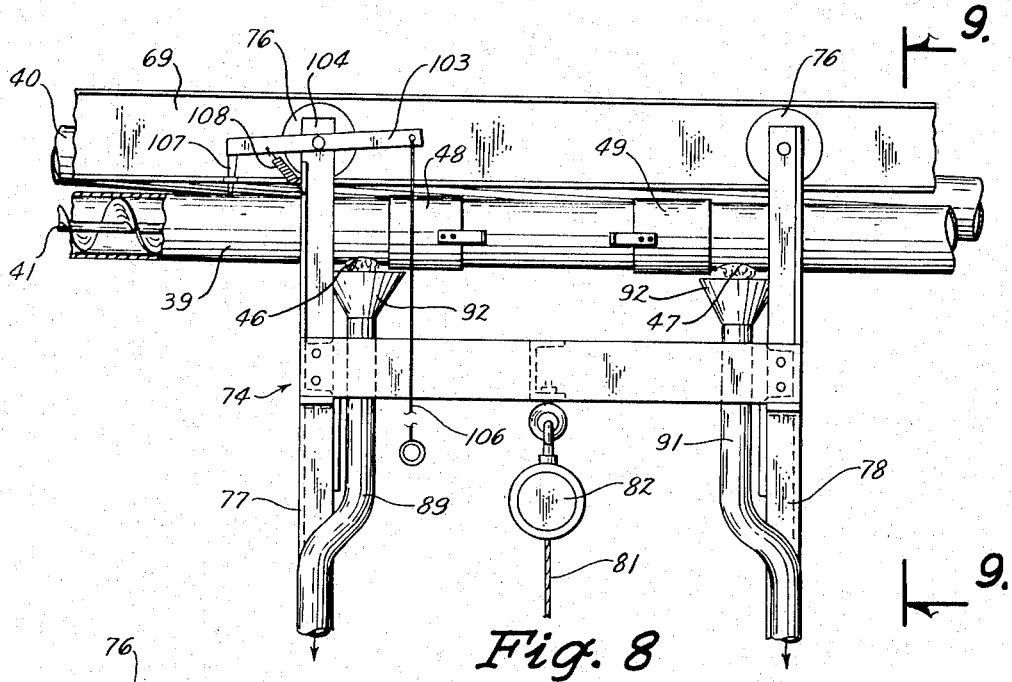
Figure 9:
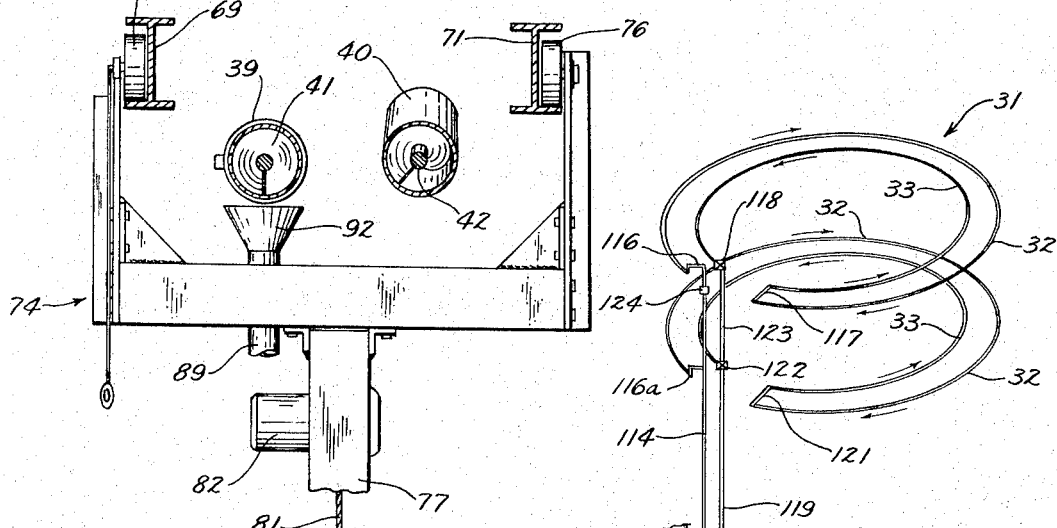

FIG. 6 is a vertical sectional view as taken along the line 6—6 in FIG. 4;

FIG. 7 is an enlarged top plan view as taken along the sectional line 7—7 in FIG. 3;

FIG. 8 is a fragmentary side elevational view of the upper part of the elevator, and showing a portion of the overhead track and feed arrangement;

FIG. 9 is a vertical sectional view as taken along the line 9—9 in FIG. 8; and

Figure 10:
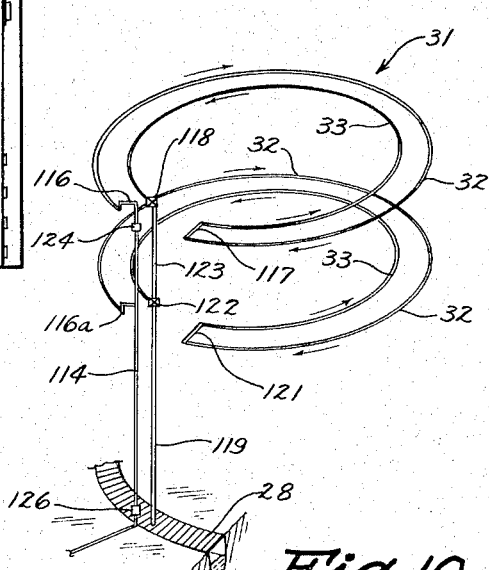

FIG. 10 is a schematic, fragmentary representation of the water system of the invention.

Referring now to the drawings, the poultry cage layer house of this invention is indicated generally at 20 in FIG. 3, and comprises a circular bin 21 within which a plurality of cages 22 are mounted on the floor 23 of the bin 21 in substantially circular, radially spaced rows 24, 25, and 26 (FIGS. 1 and 3), wherein the cages 22 are arranged horizontally side-by-side and stacked vertically one on top of another.

The layer house 20 comprises further means indicated generally at 27 (FIG. 2) mounted at the bottom of each cage 22 for providing a gravity-type removal of the droppings from the bird of each cage into a sanitation trench 28 therebelow. Referring particularly to FIG. 3, it is seen that three annular continuous sanitation trenches 28 are formed in radially spaced relation in the floor 23 of the bin 21. The main purpose of these trenches, each of which is covered by a grate 29, is to receive the droppings, and as seen hereinafter, other waste and cleansing material from the cages 22, for disposal to a sewer (not shown), septic tank, or other disposal means external the house 20.

Additionally, the layer house 20 includes a water dispensing system indicated generally at 31 in FIG. 10, and wherein an outer water trough 32 (see FIG. 2) and an inner water trough 33 is provided for each horizontal group of cages 22 in each of the three cage rows. This system 31 will be described more in detail hereinafter.

In addition, the layer house 20 comprises means for delivering feed to each cage, which includes an overhead feed hopper 34 (FIG. 3) mounted at the apex of the conical roof 36 for receiving feed from an elevator 37. Below the hopper 34 is a hollow housing 38 from which extend a supply tube 39 and a by-pass tube 40 within which are rotatably mounted augers 41 and 42 (FIG. 9) respectively, driven by a motor 43 (FIG. 7) at one end of the supply tube 39, and a pulley and belt unit 44 at the other end thereof.

A plurality of openings 46 and 47 (FIG. 8) are formed at predetermined intervals along the feed supply tube 39, and which are controlled by longitudinally slidable gate valves 48 and 49 shown herein as manually operated, but which could be remotely operated. As shown in FIG. 8, with the gate valves 48 and 49 open, feed falls by gravity from the tube 39, the feed having been transferred along the tube 39 by rotation of the auger 41 therein. Should the auger 41 rotate without either gate valve open, the feed is merely by-passed at the outer ends of the tubes 39 and 40 as indicated by the arrows in FIG. 7, and returned to the housing 38.

Figure 2:
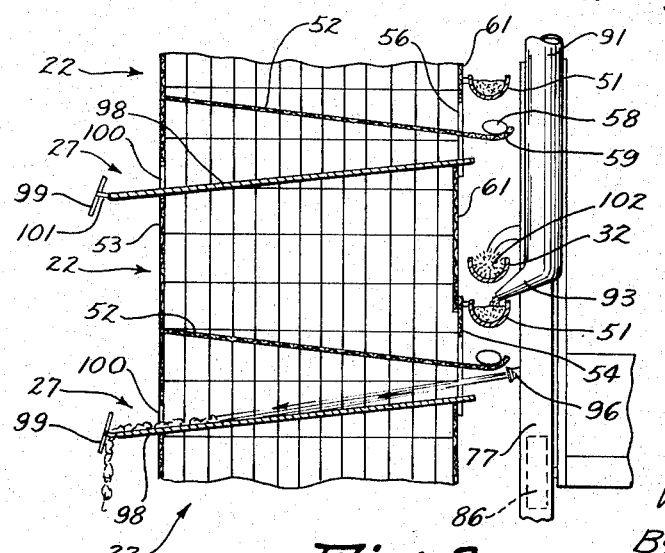
FIG. 2 is an enlarged, fragmentary vertical sectional view as taken along the line 2—2 in FIG. 1.

Referring to FIG. 2, it is clearly seen that a feed trough 51 is secured and extends in front of each cage, with each trough 51 extended completely about the inner and outer peripheries of each row 24, 25, and 26 of cages. The means for transferring the feed from the overhead feed supply tube 39 to each of the vertical stacked, horizontally extended feed troughs 51 will be explained hereinafter.

The layer house 20 includes further a forwardly sloping, foraminous floor 52 (FIG. 2) at the bottom of each cage 22 for supporting the bird therein. Additionally, due to the slope of the floor 52 from the rear wire screen wall 53 of each cage 22 toward the front wire screen wall 54, and due to an opening 56 being formed at the base of each wall 54, any and all eggs 58 laid therein will roll forwardly on the floor 52. To catch the eggs and prevent them from falling to the bin floor 23, the front 59 of each cage floor is curved upwardly as best illustrated in FIG. 2. Each cage 22 also includes a gate 61 in the front wall 54 thereof for entrance and exit to and from the cage, and which has an opening (not shown) formed therein through which the bird may thrust its head for feeding purposes.

As mentioned hereinbefore, the feed supply and by-pass tubes 39 and 41 extend downwardly from the housing 38. They are supported at their outer by-pass ends on the outer end of a track structure indicated generally at 62 in FIG. 7, which structure is operable to rotate circularly in either direction about the center of the bin 21, as shown by the curved arrow in FIG. 7. The track structure 62 is mounted at its inner end to the housing 38 which is rotatably mounted at the upper end of a center post 63 (FIG. 3) of the bin 21, the upper end of the housing 38 receiving the lower end of the hopper 34. The outer end of the track structure 62 has a pair of rollers 64 and 65 (FIG. 7) secured thereto, and rollable upon a rail 66 secured about the upright wall 67 of the bin 21. The rollers are radially adjustable to provide for any out-of-roundness of the bin. To rotate the track structure 62, a reversible motor 68 drives one of the rollers 64 and 66. Referring to FIG. 9, it is best seen that the track structure includes basically a pair of elongated, parallel, laterally spaced I-beams 69 and 71 which serve to support a radially movable elevator unit, indicated generally at 72 in FIG. 3.

To support an operator for the layer house 20 plus one or more egg cartons 73 (FIG. 4), for gathering eggs 58, inspecting the birds, and cleansing the cages 22 and water troughs 32 and 33, plus inserting and removing the layers is the prime purpose of the elevator unit 72. It comprises a rectangular frame indicated generally at 74 in FIGS. 8 and 9 rollably supported on the I-beams by a quartet of wheels 76, and from which depends a pair of channel members 77 and 78 (FIGS. 4 and 8) to a position right above the bin floor 23 (FIG. 3).

Figure 5:
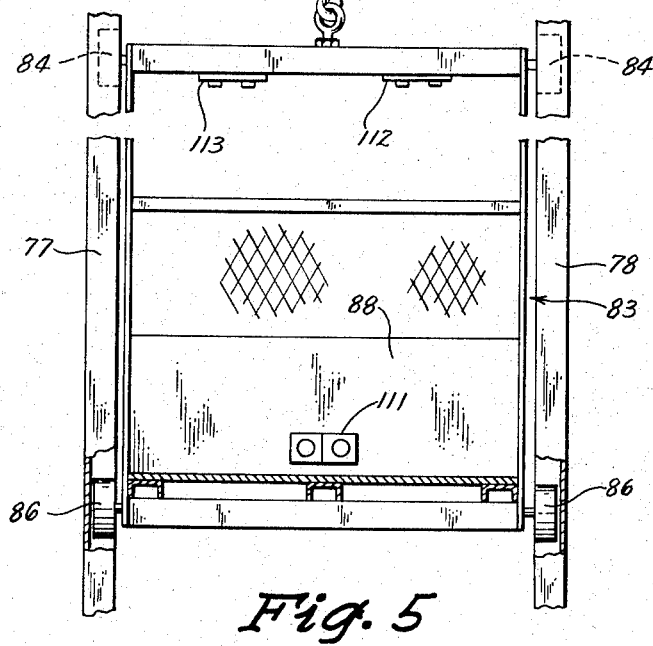
FIG. 5 is a vertical sectional view as taken along the line 5—5 in FIG. 4.

An elevator 79 (FIG. 4) is suspended by a cable 81 from a hoist motor 82 connected to the frame 74, and comprises itself a box-like frame indicated generally at 83 in FIG. 5, which frame 83 is maintained against swaying by a pair of vertically spaced rollers 84 and 86 (FIGS. 4 and 5) rotatably mounted on each side thereof. A pair of seats 87 and 88 are provided for the operator so that he or she may sit facing either direction desirable when the elevator 79 is moved by the track structure 62 (FIG. 7).

Referring to FIG. 8, it is seen that a pair of stationary conduits 89 and 91 are provided on either side of the elevator 79, each with a funnel 92 at its upper end disposed directly below the supply tube 39 openings 46 and 47. The conduits 89 and 91 are telescopically constructed at their areas intermediate their upper ends, and their lower discharge ends 93 (FIGS. 2 and 6), whereby feed from the tube 39 can be transmitted therefrom to a feed trough 51, at any arcuate place therein, at the uppermost level of cages 22, to a feed trough 51 at the lowermost level thereof.

Also depending from the overhead track structure 62 is a flexible water hose 94 (FIG. 3), divided into two conduits the lower nozzle ends 96 (FIGS. 2 and 4) of which are removably fastend to a bracket 97 on the elevator 79 so as to be pointed, at a certain position of the elevator 79, directly toward the upper surface of a cage droppings board 98 on either side of the elevator. It should be pointed out here that the droppings removal means 27 includes a rerawardly sloping board 98 as best illustrated in FIG. 2, supported below each cage floor 52 for disposing of the droppings by gravity through an opening 100 in the rear cage wall 53. At the rear of each board 98 and directly over each sanitation trench 28 (FIG. 3), is a deflection shield 99 spaced outwardly from the board end to form an open slot 101.

Thus, not only can the droppings fall from the boards 98 by gravity into the trenches 28, but also upon cleansing the cages 22 and the boards with water from the nozzles 96, that cleansing material runs downwardly and off the boards 98.

Referring to FIGS. 2 and 6, it will also be seen that the elevator 79 carries also a pair of sponges or brushes 102, one on each side thereof and adjustably mounted for insertion into a respective water trough 32 and 33 for cleaning purposes. To locate the elevator 79 longitudinally on the I-beams 69 and 71 such that it is spaced exactly between each pair of cage rows (FIG. 3), a locking bar 103 (FIG. 8) is provided. The bar 103 is pivoted at 104 to the frame 74, and is movable by means of a cord 106 depending to the elevator 79 for manipulation by the operator therein. The end of the locking bar 103 opposite the cord attachment end has a dog 107 adapted to extend through an opening (not shown) in a flange of the I-beam 69. The locking bar 103 is biased to the position illustrtaed in FIG. 8 by means of a spring 108. Thus, when the elevtaor 79 is properly located such that the dog 107 engages the I-beam flange, the elevator 79 is properly located. It should be noted here that the elevator 79 is moved radially of the layer house 20 and upon the track structure 62 by manual movement of the elevator 79.

For this purpose, as well as for other ingress and egress purposes, an alleyway 109 (FIG. 1) is formed between arcuately spaced ends of the cage rows 24–26. Thus, when the elevator 79 is located in the alleyway, the operator alights therefrom, pushes the elevator 79 to a position susbtantially between adjacent pairs of cages. Simultaneously, he is manipulating the locking bar 103 (FIG. 8) such that when the elevator 79 reaches the exact position for arcuate movement about the layer house 20, the locking bar is sprung into position with the dog 107 engaged. This indicates to the operator that the elevator 79 is properly located for arcuate movement by operation of the motor 68 (FIG. 7).

Within the elevator 79, a trio of switch units 111, 112, and 113, (FIG. 5) are provided for the manipulation by the operator to control the entire system. Thus, below each seat 87 and 88 (FIG. 4) the switch unit 111 controls the operation of the motor 68 for moving the elevator 79 forwardly or rearwardly in an arcuate manner about the bin 21, and as indicated by the curved arrow in FIG. 7. Operation of the switch unit 112 (FIG. 5) controls operation of the hoist motor 82 for raising and lowering the elevator 79. To control operation of the feed supply motor 43 (FIG. 3), the switch unit 113 is so provided.

Referring to FIG. 10, where an example of the water system 31 is illustrated, an upstanding pipe 114 is provided at one end of each cage row 24, 25, and 26, and extends upwardly to the top of each row where it supplies through an outlet 116 water to one end of, for example, the outer water trough 32. Water thus flows into the trough 32 until it reaches the other end thereof where it is passed by a cross-over trough 117 to the opposite end of the inner water trough 33. The water again flows about the inner water trough 33 until it reaches the other end to an overflow valve 118. The valve 118 is fluidly connected to the upper end of a conduit 119 which depends to discharge the water into a respective trench 28 for disposal thereof. It will be noted the bottom end of the conduit 119 is closely adjacent the bottom end of the pipe 114, as are the upper ends thereof.

At the next lower level of cages 22, the pipe 114 is provided with another outlet 116a for supplying water to one end of the outer water trough 32 for that row of cages. The water again flows through the trough 32, within a cross-over trough 121 to the inner water trough 33 and to another overflow valve 122, where that water is discharged through the upright conduit 119. The water piping and valve arrangement for the upper two cage levels of each cage row, as shown in FIG. 10, is repeated at every lower row of cages therein, and with the same arrangement of FIG. 10 being repeated for each cage row 24, 25, and 26. Appropriate valves 124 and 126 are provided at the upper and lower ends, respectively, of each pipe 114 for controlling the flow of the water.

In summation, it can readily be seen that the layer house 20 and the arrangement thereof as described hereinbefore provides an egg laying house wherein substantially the entire process of feeding the layers, disposing of the droppings, cleansing the cages, the watering troughs, and the droppings boards, and furthermore gathering the eggs and servicing the layers and their cages is substantially fully automated. For example, the operator may enter the elevator 79, and after adjusting each discharge end 93 for feed, each nozzle 96 for water spray, and each sponge 103 for cleansing a water trough, actuate the appropriate motor for moving the elevator 79 in one direction. Then while sitting in an appropriate seat, he or she may gather eggs from either one or both sides of the elevator 79, the movement of which can be regulated by operation of the motor 68. The movement takes place on one horizontal level whereby both sides of the elevator 79 relative to the cages therein can be serviced. When the elevator 79 reaches the end of both cage rows, it is then automatically raised by operation of the hoist motor 82 to the next horizontal group of cages, with the process being repeated.

Figure 1:
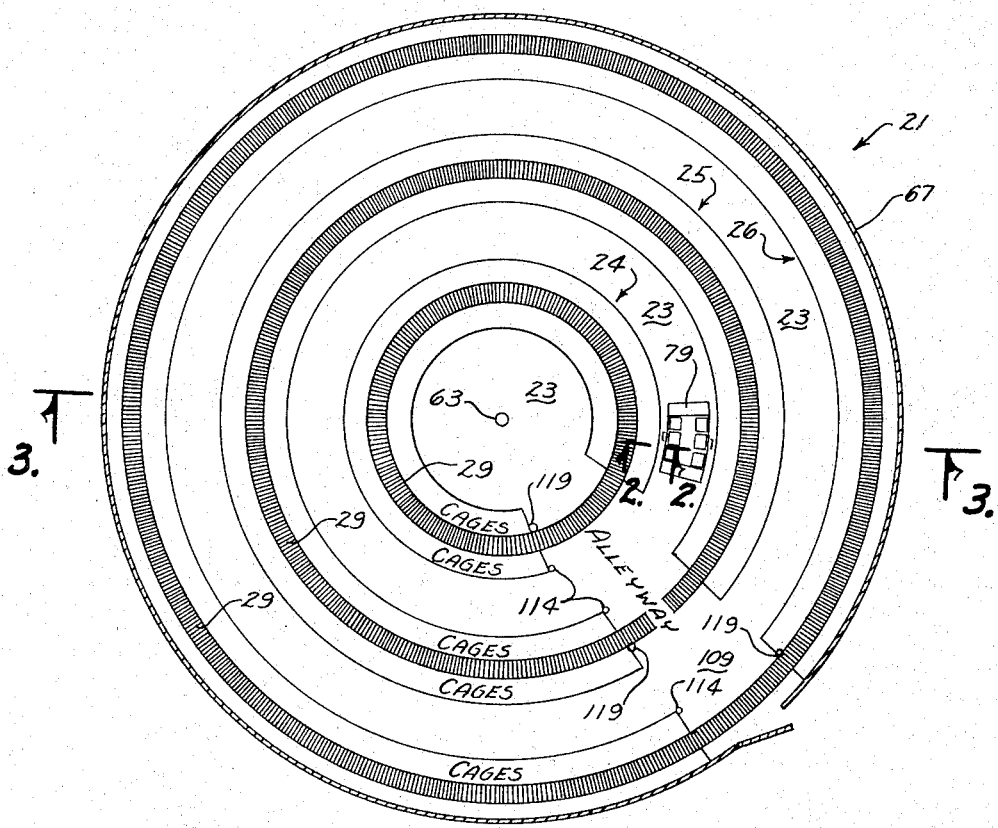
FIG. 1 is a plan view of the poultry cage layer house of this invention, wherein the roof of the house has been removed.

Then, when an entire horizontal and vertical group of cages 22 on either side of the elevator 79 have been serviced, the elevator may be moved to a position between or to one side of the next row of cages for the exact same operation. Referring to FIG. 1, it can readily be seen that one arcuate movement of the elevator 79 on the inner periphery of the cage row 24 provides for gathering all eggs from that horizontal group of cages. A second arcuate movement of the elevator 79 on the same level but between the outer and inner group of cages of rows 24 and 25, respectively, gathers all eggs in those two horizontal groups of cages. A third arcuate movement of the elevator 79 between the outer and inner group of cages of the rows 25 and 26, respectively, also provides for gathering all eggs of those two rows on the same horizontal level. For each additional horizontal group of cages stacked upon the first group, but one more arcuate movement of the elevator 79 at each position thereof is necessary.

Thus, should there be twelve groups of cages stacked high for each row of cages thereof, twelve arcuate paths would but be necessary to gather eggs and service all twelve stacks of cages. Furthermore, and as importantly, due to the controls of all automated systems of the layer house 20 being available in the elevator 79, it may be stopped at any time for servicing any cage, moved upwardly and downwardly while in place for the same purpose, and of course moved forwardly or rearwardly as the case may warrant. Although not shown herein, it is to be noted that automatic movement of the elevator 79 radially of the bin 21 by motorized means is entirely conceivable.

Although a preferred embodiment of the invention has been described hereinbefore, it is to be remembered that various modifications and alterations can be made thereto without departing from the true spirit and scope of the invention as defined by the appended claims.

I claim:
1. A poultry cage layer house comprising:
a bin having a roof and a substantially circular upstanding wall enclosing a floor;
a plurality of cages mounted on said floor in substantially circular rows, said rows spaced apart radially and said cages stacked side-by-side and one on top of another;
a substantially annular sanitation trench formed in said floor extended adjacent and concentric with each cage row whereby to receive the droppings;
means mounted relative to each cage for transmitting bird droppings therefrom to said trench;
means for supplying water to each cage;
means for supplying feed to each cage;
means mounted over said cage rows for discharging feed therefrom;
floor means mounted in each cage for moving eggs laid in each cage to a gathering location;
track means mounted over said cage rows for movement about said bin;
elevator means attached to said track means and movable horizontally thereon radially of said bin, and movable vertically relative to said track means whereby to be placeable in front of each cage; and
feed transmitting means mounted on said elevator means for transmitting feed from said feed discharging means to said feed supplying means.

2. A poultry cage layer house as defined in claim 1, and further wherein adjacent pairs of cage rows are arranged back-to-back and in contiguous relation with a sanitation trench therebetween, droppings from said bird droppings means thereby disposed into said trenches.

3. A poultry cage layer house as defined in claim 1, and further wherein said circular rows of cages are concentric relative to the center of said bin, and have a common, radial alleyway formed from the center of the bin outwardly over said floor to an exit formed therefor in said wall.

4. A poultry cage layer house as defined in claim 1, and further wherein each cage has a perforated floor sloped from the rear of said cage to the front thereof and extended beyond the front wall of said cage in the form of a tray for retaining eggs therein, and further wherein said droppings transmitting means comprises a solid member sloped from the front of said cage to the rear thereof whereby to dispose of the droppings directly into a sanitation trench.

5. A poultry cage layer house as defined in claim 1, and further wherein a feed hopper is supported beneath the apex of said roof for holding a supply of feed, and said feed discharging means includes a feed conveyor connected to said hopper for removing feed therefrom and transmitting said feed radially away therefrom, and a plurality of gate valve devices spaced longitudinally of said conveyor for discharging feed therefrom by gravity.

6. A poultry cage layer house as defined in claim 1, and further wherein said bin includes a centerpost and a rail device extended about said bin, said track means rotatably secured at opposite ends to said post and to said rail device for movement about said post.

7. A poultry cage layer house as defined in claim 1, and further wherein said elevator means includes a vertically extended framework rollably mounted on said track means for radial movement of said bin on said track means, and including a hoist unit attached to said track means connected to for raising and lowering an elevator from said floor to adjacent said track means whereby said elevator is movable to and held stationary directly in front of any cage, said elevator movable in a horizontal plane between all horizontally aligned and radially spaced cages of a pair of opposed cage rows, and movable radially in a horizontal plane from between one such pair of opposed cage rows to a position between another such pair of opposed cage rows.

8. A poultry cage layer house as defined in claim 5, and further wherein said feed transmitting means includes one or more vertically disposed tubes secured to said elevator means and telescopically extendable from a shortened condition for transmitting feed by gravity from one of said gate valve devices to means for holding feed mounted in front of an upper cage, to a lengthened condition for so transmitting feed to one said feed holding means in front of a lower cage.

9. A poultry cage layer house as defined in claim 5, and further wherein said feed discharging means includes a second feed conveyor the outer end of which is adapted to receive feed from the outer end of said first feed conveyor, and the inner end of which is connected to said hopper for dumping feed received from said first feed conveyor back into said hopper.

10. A poultry cage layer house as defined in claim 7, and further wherein said means for cleansing said cages includes a nozzle device mounted on said elevator for directing water under pressure directly at the bottom of each cage, and particularly for directing said water over the upper surface of said droppings transmitting means, said latter means sloped downwardly and away from said nozzle device.

References Cited

UNITED STATES PATENTS

| | | | |
|---|---|---|---|
| 406,248 | 7/1889 | Williams | 119—51 |
| 2,608,178 | 8/1952 | Kolber | 119—21 |
| 2,735,400 | 2/1956 | Stubbs | 119—18 |
| 2,886,001 | 5/1959 | Kitson | 119—45 |
| 2,969,040 | 1/1961 | Siptrott | 119—18 X |
| 3,018,759 | 1/1962 | Helbig | 119—21 |

ALDRICH F. MEDBERY, *Primary Examiner.*